(12) United States Patent
Schwingeler et al.

(10) Patent No.: US 7,073,216 B2
(45) Date of Patent: Jul. 11, 2006

(54) MULTI-PURPOSE RECLINER DEPLOYABLE INSIDE AND OUTSIDE A VEHICLE

(75) Inventors: Klaus Schwingeler, München (DE); Peter Hinze, Altomünster (DE)

(73) Assignee: Man Nutzfahrzeuge Osterreich AG (AT)

( * ) Notice: Subject to any disclaimer, the term of this patent is extended or adjusted under 35 U.S.C. 154(b) by 0 days.

(21) Appl. No.: 10/883,562

(22) Filed: Jul. 1, 2004

(65) Prior Publication Data

US 2005/0022304 A1   Feb. 3, 2005

(30) Foreign Application Priority Data

Jul. 1, 2003   (DE) ................... 103 29 460

(51) Int. Cl.
*A61G 1/13* (2006.01)
*B60R 7/00* (2006.01)
(52) U.S. Cl. .............. 5/118; 5/627; 296/190.02; 296/24.38
(58) Field of Classification Search .............. 5/627, 5/118, 119, 94; 296/190.02, 24.38
See application file for complete search history.

(56) References Cited

U.S. PATENT DOCUMENTS

| | | | | |
|---|---|---|---|---|
| 2,970,323 A | * | 2/1961 | Griffith et al. ............... | 5/118 |
| 3,524,673 A | * | 8/1970 | Beeson et al. ............... | 296/156 |
| 4,221,424 A | * | 9/1980 | Eiserman et al. ............ | 296/152 |
| 4,807,314 A | * | 2/1989 | Fry et al. ..................... | 5/118 |
| 5,170,521 A | * | 12/1992 | Light ........................... | 5/118 |
| 5,529,341 A | * | 6/1996 | Hartigan ...................... | 280/749 |
| 6,230,340 B1 | * | 5/2001 | Edwards ...................... | 5/118 |
| 6,327,726 B1 | * | 12/2001 | Weber .......................... | 5/655 |
| 6,470,517 B1 | * | 10/2002 | Kang ............................ | 5/118 |

FOREIGN PATENT DOCUMENTS

DE   3625633 A1 *  2/1988

* cited by examiner

*Primary Examiner*—Alexander Grosz
(74) *Attorney, Agent, or Firm*—Robert W Becker & Associates; Robert W Becker (57) ABSTRACT

A multi-purpose recliner is provided having a recliner surface on which a person may recline and deployable for use inside and outside a vehicle, especially a military vehicle. The multi-purpose recliner includes a recliner surface material that can be rolled out, the recliner surface material forming the recliner surface and having a pair of receipt devices each extending along a respective length edge of the recliner surface material, and a disassembly-capable mount. The disassembly-capable mount includes a pair of stringers each being removably disposable in a respective one of the receipt devices of the recliner surface material and a pair of spacers releasably securable with the stringers. The multi-purpose recliner also includes a suspension structure for alternately retaining the recliner surface material in a rolled up condition and suspending the recliner surface material in a rolled out condition within the interior of the vehicle.

6 Claims, 8 Drawing Sheets

MULTI-PURPOSE RECLINER DEPLOYABLE INSIDE AND OUTSIDE A VEHICLE

BACKGROUND OF THE INVENTION

The present invention relates to a multi-purpose bed or recliner having a recliner surface on which a person may recline and deployable for use inside and outside a motor vehicle, especially a military vehicle.

A multi-purpose recliner of this type is disclosed, for example, in DE 36 25 633 A1 and comprises two rigid tube frame halves that are connectable to one another and on which the recliner surface is extended under tension. This known recliner can be placed in vehicles directly behind the seat backs or can be disposed on the seat backs. This known recliner can, as needed, be provided with additional components. With the known recliners, the height space in a vehicle above the sitting area is used as a quiet space for vehicle passengers or also used for storage purposes. Also, the recliner can be used outside the vehicle. After the separation of the two rigid tube frame halves in preparation of stowage of the recliner, however, difficulties are experienced with respect to stowage of the recliner in the vehicle.

SUMMARY OF THE INVENTION

The present invention offers a solution to the challenge of providing a multi-purpose recliner that, during non-use periods, can be easily stored and that can fulfill additional functions beyond the deployment thereof as a sleeping recliner.

In accordance with the present invention, the recliner surface is configured of a material that can be rolled up and on whose longitudinal edges receipt structures are provided for receiving stringers which enhance the longitudinal or lengthwise stability of the recliner surface. The stringers are removably received in the receipt structures, the receipt structures being provided along the longitudinal edges of the recliner surface in the form, for example, of loops or tube-like structures formed of the recliner surface material. The stringers can be inserted into these receipt structures and then subsequently removed therefrom. At least two spacers that are releasably connected with both stringers are provided for cross stability of the recliner surface. Both stringers are retained, via the spacers, at a spacing from one another at approximately the width of the recliner surface. In this connection, the recliner surface is spread out and, in particular, is disposed in a slightly tensioned condition on the mount or frame formed of the stringers and the spacers. The material that can be rolled up, which forms the recliner surface, can be configured, for example, as a net but, however, can also be configured of suitable textile material or durable cloth.

During non-use, the stringers and the spacers of the disassembly-capable frame are disassembled from one another. The material forming the recliner surface such as, for example, a recliner net, is wound around one of the two stringers. The other of the two stringers and the two spacers comprising the balance of the thus-disassembled recliner can be stowed by lashing the recliner firmly in place at a suitable location in a vehicle such as, for example, in a holding device on the back wall of the cab of the vehicle.

The suspension structure for suspending the recliner can be secured at at least four locations that are preferably on the longitudinal edges of the material web forming the recliner surface. In this connection, belts or hanging loops or the like can be used. Corresponding hanging points are provided in the vehicle interior, in particular, in the cab of the vehicle, at which the belts or, respectively, the loops, which form the suspension structures, are hung, so that the multi-purpose recliner is deployable in a suspended disposition as a sleeping recliner in the vehicle, especially in its cab.

As the frame or, respectively, the rack, of the multi-purpose recliner can be disassembled, the recliner surface, especially in the form of a recliner net, can, after the removal of the stringers and the spacers of the frame and with the assistance of the belts or, respectively, the hanging loops, also be suspended as a cot in, for example, the cab of the vehicle.

Additionally, the frame of the multi-purpose recliner formed of the stringers and the spacers can comprise pivotable or, preferably, releasable, foot pedestals. The multi-purpose recliner can then be deployed, for example, as a field recliner on a ground or floor surface that can be, as well, outside the vehicle. The foot pedestals can comprise hoops, whereby the hoop-shaped foot pedestals, which are releasably insertable into the stringers, can at the same time perform the function of maintaining the stringers at the requisite spacing from one another, provided that the securement of the foot pedestals is commensurate with this function. Moreover, hand grips can be provided on extensions of both stringers or can be secured in a releasable manner on the frame via bolt connections or insert connections so that the multi-purpose recliner can, as well, be deployed in this condition as a carrier for the transport of the infirm or injured.

Additionally, the web that forms the portion of the recliner surface that can be rolled up—especially, in the configuration thereof as a recliner net—fulfills as well the function of a hold back or, respectively, a storage or packing net, in the vehicle interior and, in particular, fulfills this function in the cab of a cross country or military vehicle. In this connection, the recliner surface, along with one of the two longitudinal stringers, can be fixedly secured in a corresponding receipt structure in the vehicle interior and can be arranged in a tensed condition by, for example, tension belts, as it extends toward the other longitudinal stringer in front of, or above, items to be stored in the vehicle.

The present invention finds usage, in particular, in connection with military vehicles, especially in the cab of a military vehicle but, as well, in cross country vehicles, utility vehicles, and the like, due to its multiple deployment capability and space-saving storage capability during non-use.

BRIEF DESCRIPTION OF THE DRAWINGS

The present invention is described in more detail hereafter with reference to the drawings in which several embodiments of the present invention are described in more detail.

DETAILED DESCRIPTION OF THE PREFERRED EMBODIMENTS

Figure 3:
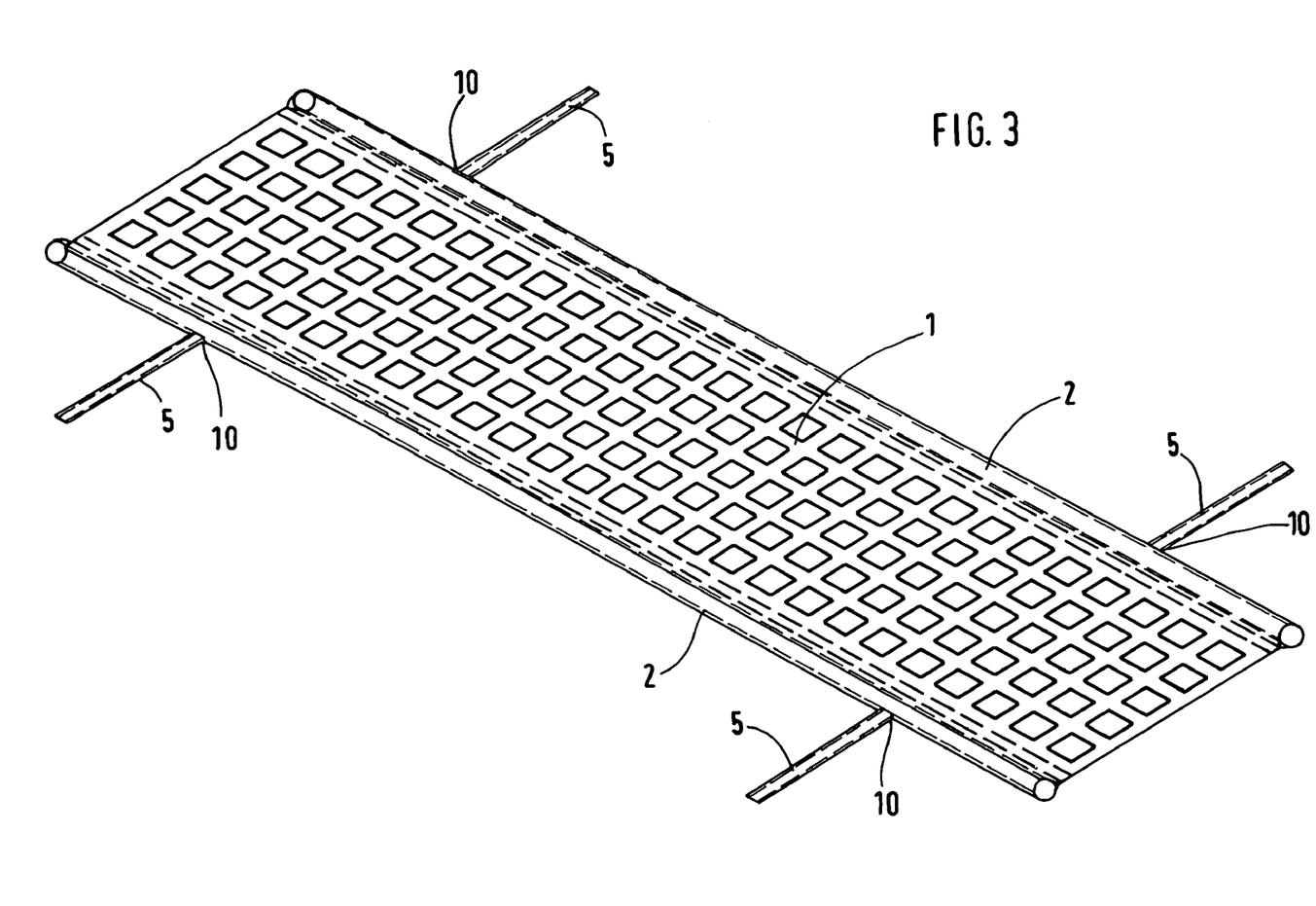
FIG. 3 is an enlarged perspective view of another embodiment of the recliner surface material of the recliner of the present invention configured as a net.

The multi-purpose recliner shown in the figures of the drawings comprises a recliner surface material 1 that can be rolled up, the recliner surface material 1 forming the recliner surface of the recliner and having receipt structures 2 and a disassembly-capable rack that is comprised of two stringers 3 as well as two spacers 4 that are preferably connectable to the ends of the stringers. The stringers 3 and the spacers 4 can be produced of stable tubes and, in particular, metal tubes. Both stringers 3 can be inserted in the receipt structures 2 that extend along the longitudinal edges of the rollable recliner surface material 1. The receipt structures 2 can be configured as receipt tubes that, for example, are produced via stitching of the recliner surface material 1 along the longitudinal edges thereof. In lieu of the receipt tubes extending along the longitudinal sides, the receipt structures 2 can also be configured as receipt loops on the longitudinal edges of the rollable recliner surface material 1. Preferably, the recliner material is comprised of a net that can be seen in a perspective view from above in FIG. 3.

The pair of spacers 4 are releasably connected with the stringers 3 via, for example, insert connections. Instead of such insert connections, bolt connections can be provided as well. The recliner surface material 1 is held via the spacers 4 in a slightly tensioned condition between the pair of stringers 3, which themselves ensure the length stability of the multi-purpose recliner.

Figure 1:
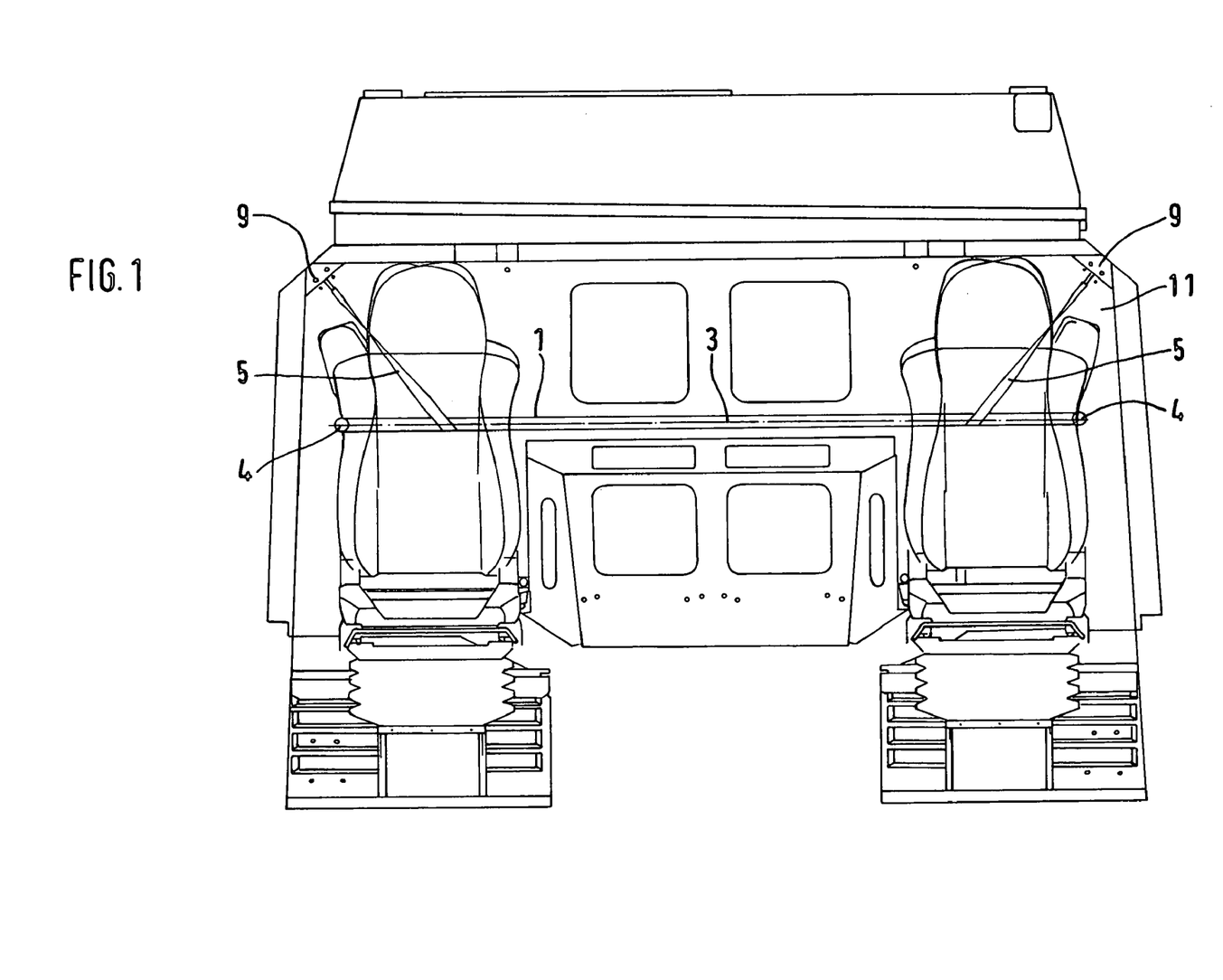
FIG. 1 is a sectional elevational view of the cab of a military vehicle, as viewed toward the front of the cab, with the cab having two copies of one embodiment of the recliner configured as a sleeping recliner.
Figure 2:
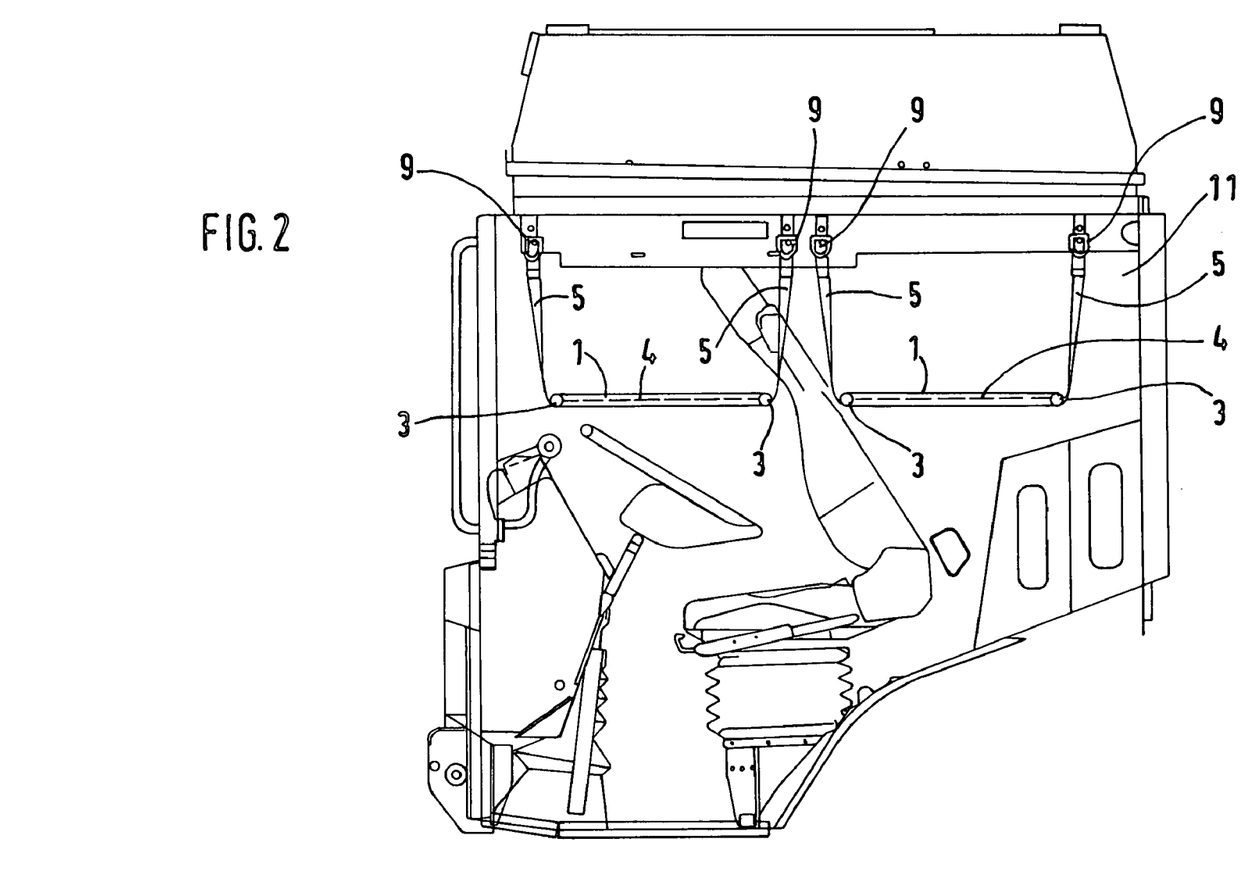
FIG. 2 is a sectional elevational view of the cab of the vehicle shown in FIG. 1 in which, as viewed from the side of the cab, the two multi-purpose recliner surfaces are shown suspended as sleeping recliners.

In one deployment configuration, the multi-purpose recliner can be deployed in a suspended disposition as a sleeping recliner in the vehicle, especially in the cab of a military vehicle, as can be seen in FIGS. 1 and 2. In this connection, a suspension structure in the form of belts or loops 5 is provided. In the illustrated embodiment, the multi-purpose recliner comprises four loops 5 extending outwardly from its recliner surface material 1. These loops 5 are secured to the recliner surface material 1 at lateral or side securement locations 10 on the recliner surface material 1 (FIG. 3), for example, via sewing. Four receipt locations 9 are provided in the vehicle, in particular, in the cab 11, for each of the two multi-purpose recliners, which are configured in this embodiment as sleeping recliners. In this manner, two multi-purpose recliners, which extend one behind the other in the cross direction of the cab 11, can be deployed as sleeping recliners supported in suspended dispositions from the receipt locations 9 located, for example, in the roof region of the cab or the vehicle (see FIG. 2).

As the rack or, respectively, the frame, which is configured from the pair of stringers 3 and the pair spacers 4, can be disassembled, the recliner surface material 1 can be hung via the loops 5 in the receipt locations 9 in the vehicle or, respectively, the cab 11, without the frame or, respectively, the rack, so as to thereby function as a cot.

For other deployment purposes of the multi-purpose recliner, the multi-purpose recliner can be provided with foldable or releasable foot pedestals 6 on the spacers 4 or the stringers 3. The foot pedestals 6 can be configured as hoops (FIGS. 4, 5, 6) which extend over the entire width of the multi-purpose recliner, or as individual foot pedestals. The foot pedestals 6 can be connected via insert connections to provide a releasable securement or, if configured as individual foot pedestals, can also be connected via bolt connections with the stringers 3 or the spacers 4. The multi-purpose recliner can then be used as a recliner, in particular, as a field recliner disposed on a ground or floor surface including, as well, a ground or floor surface outside the vehicle.

Releasable racks, especially, those having hand grips 7 (FIG. 5), can be provided for other deployment conditions of the multi-purpose recliner. The multi-purpose recliner can then be used as a carrier for the transport of the infirm or injured.

Figure 4:
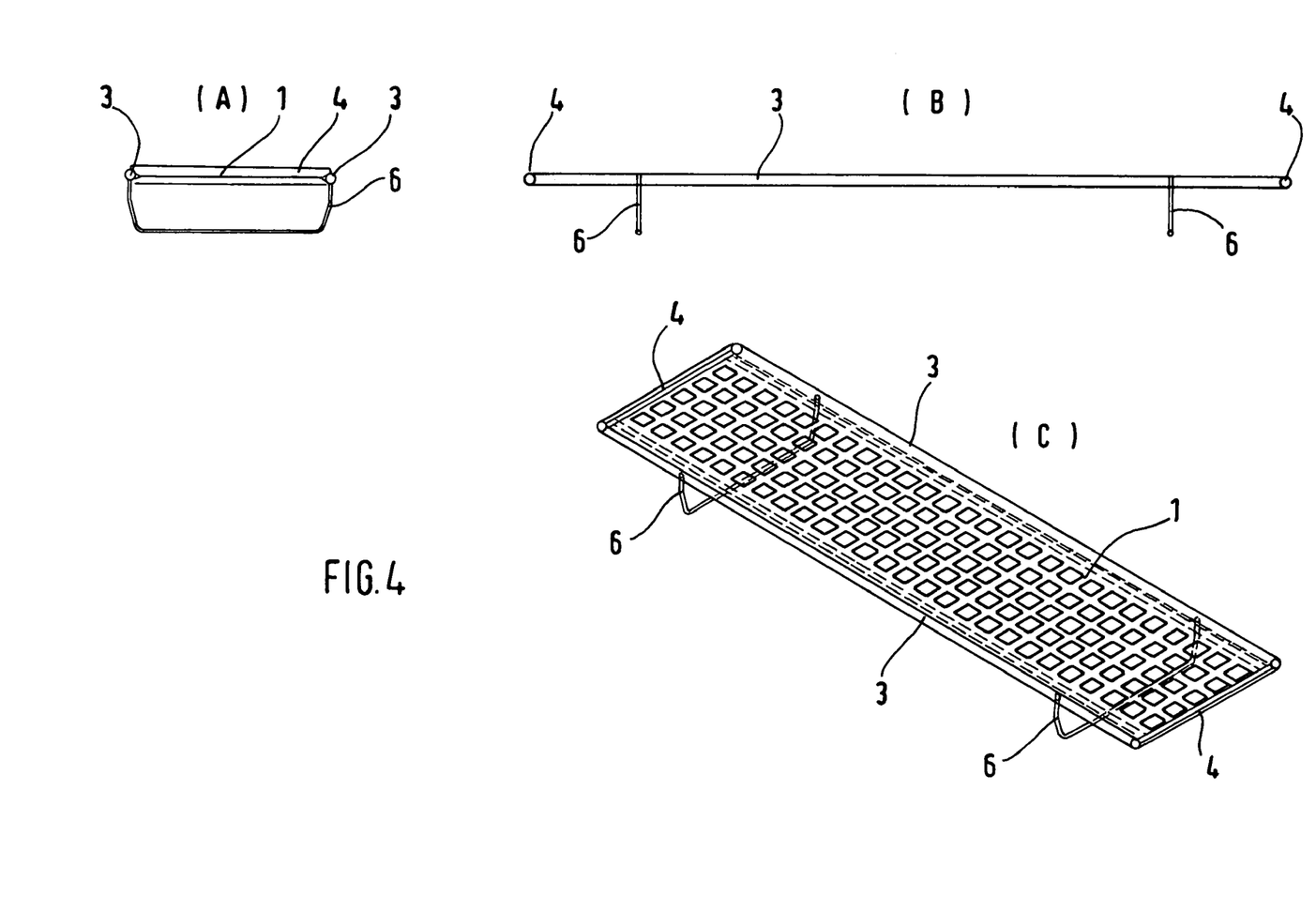
FIG. 4 shows an additional embodiment of the multi-purpose recliner in which illustration (A) is a front view, illustration (B) is a side view, and illustration (C) is a perspective view of the multi-purpose recliner.
Figure 5:
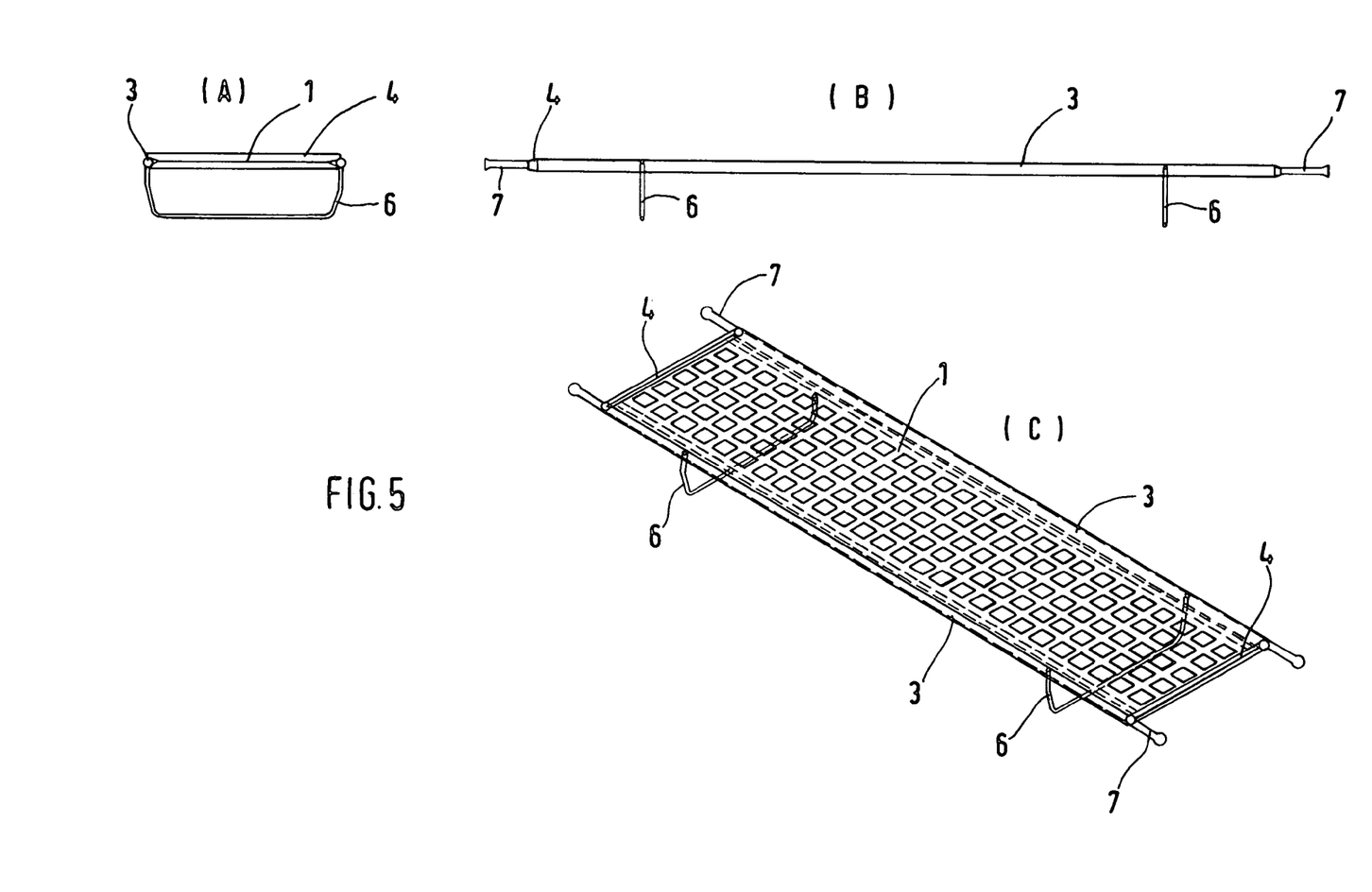
FIG. 5 shows yet another embodiment of the multi-purpose recliner in which illustration (A) is a front view, illustration (B) is a side view, and illustration (C) is a perspective view of the multi-purpose recliner.
Figure 6:
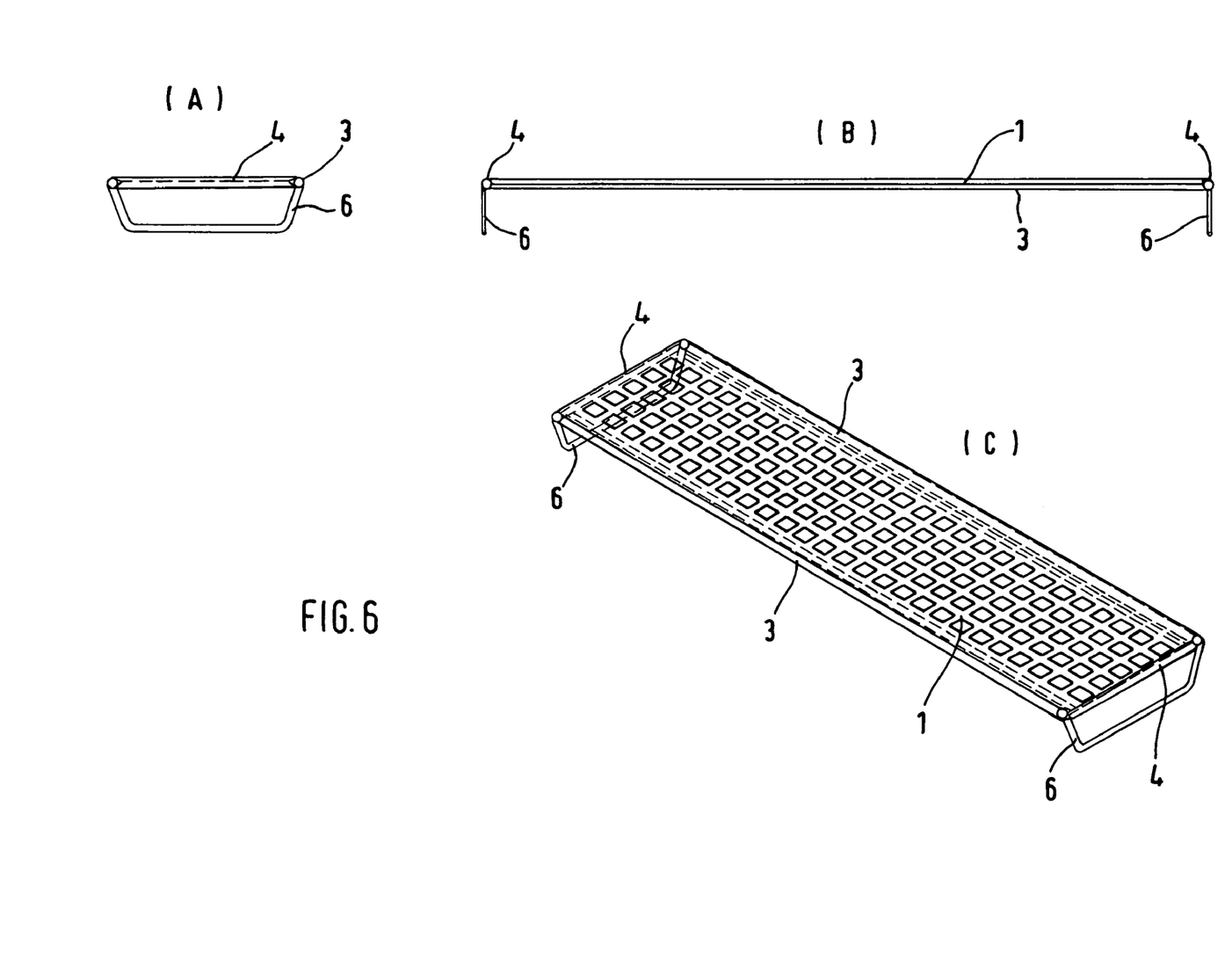
FIG. 6 shows a further additional embodiment of the multi-purpose recliner in which illustration (A) is a front view, illustration (B) is a side view, and illustration (C) is a perspective view of the multi-purpose recliner.

With respect to each of the embodiments shown in FIGS. 4, 5, and 6, illustration (A) is a front view, illustration (B) is a side view, and illustration (C) is a perspective oblique view of the respective illustrated embodiment of the multi-purpose recliner as viewed from above. The embodiment shown in FIG. 4 can be provided with hoop-shaped foot pedestals 6 releasably inserted into plug-and-socket type connectors provided in the stringers 3 for that purpose. The hoop-shaped foot pedestals are thus disposed approximately in the region of the last third of the lengthwise extent of the multi-purpose recliner. The ends of the stringers 3 are connected with the spacers 4. In the embodiment illustrated in FIG. 5, the hand grips 7, as noted hereinabove, are releasably connected, via, for example, insert connections or bolt connections, with the stringers 3 and/or the spacers 4.

In the embodiment illustrated in FIG. 6, the spacers 4 are releasably connected with the ends of the stringers 3. The hoop-shaped foot pedestals 6 are releasably connected with the spacers 4 or with the ends of the stringers. It is also, however, possible to configure the spacers 4 and the foot pedestals 6 as a single component and to releasably secure these into the ends of the stringers.

The spacers 4 of the illustrated embodiment can be releasably inserted in the receipt tubes or loops formed from the recliner surface material 1. These receipt tubes or loops can be fixedly connected with the recliner surface material via stitching or can be releasably connected with the recliner surface material 1 via wrapping around the spacers 4 and securement with textile fabric hook-and-loop type closures or snap button closures and the like. Also, the receipt devices 2 configured along longitudinal edges of the recliner surface material 1 for the stringers 3 can be configured in this manner.

Figure 7:
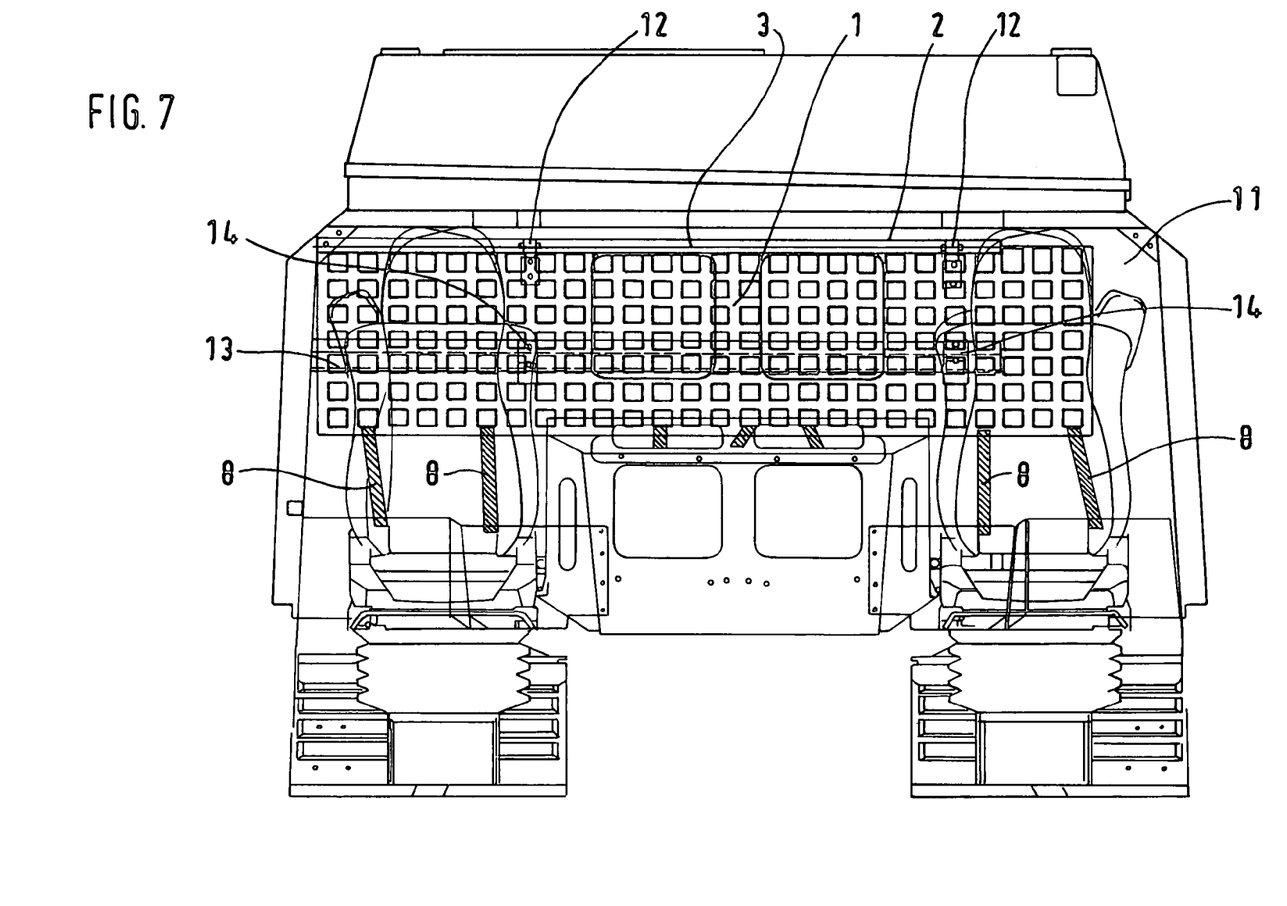
FIG. 7 is a sectional elevational view of the cab of a military vehicle shown in FIGS. 1 and 2, as viewed toward the front of the cab, and showing the placed in tensioned disposition of a recliner net deployed as a storage or hold-back net.
Figure 8:
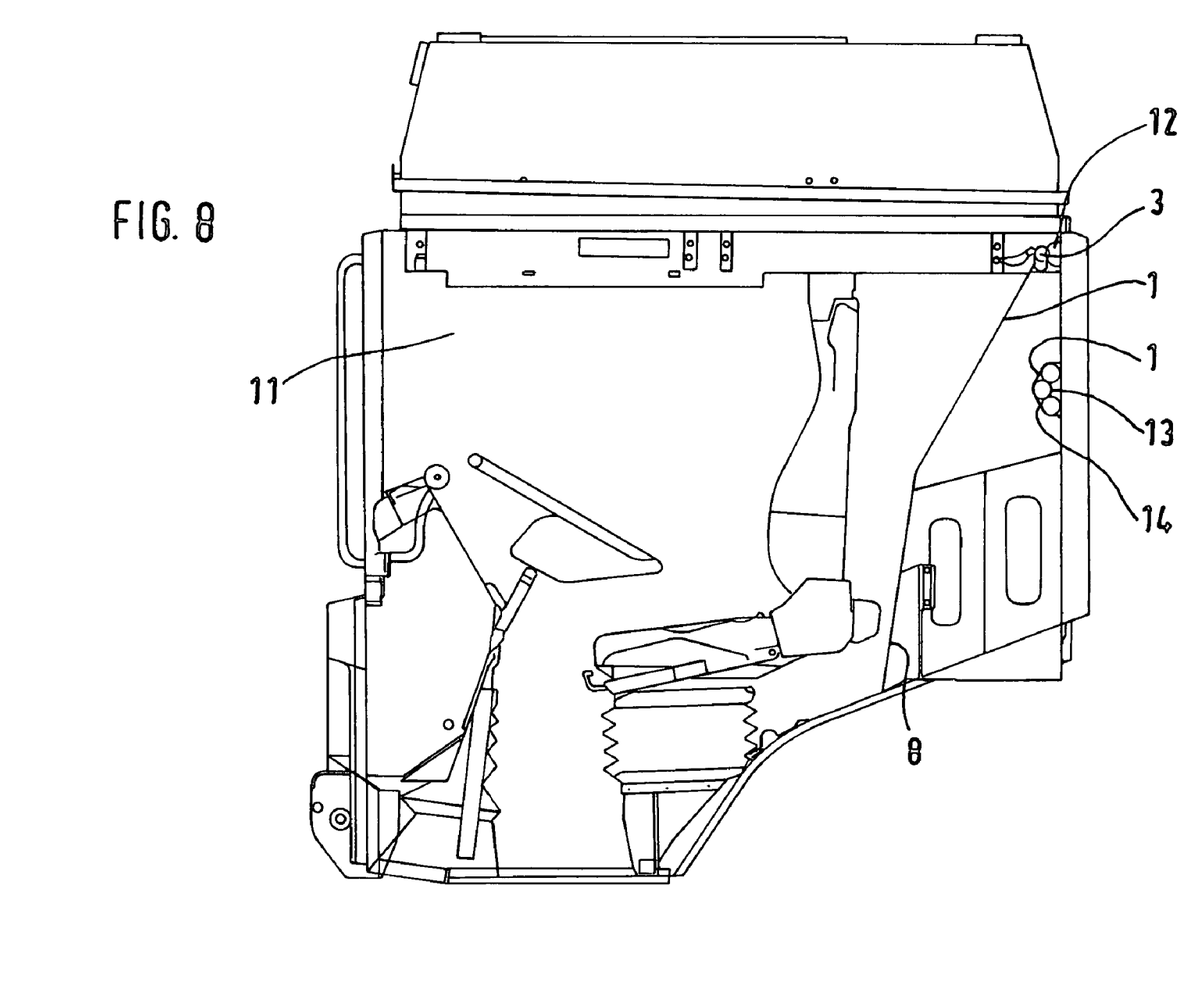
FIG. 8 is a sectional elevational view of the cab of the vehicle shown in FIG. 7, as viewed from the side of the cab, and showing the placed in tensioned disposition of a recliner net deployed as a storage or hold-back net and the stowage of portions of the multi-purpose recliner on the back wall of the cab of the vehicle.

As can be seen in FIGS. 7 and 8, the recliner surface material 1, which is, in particular, configured as a net, can be deployed as a hold-back or storage net with a generally vertical or slantwise orientation. In this connection, one of the stringers 3 is left in the receipt device 2 and the other stringer is removed from its respective receipt device 2. With respect to the stringer 3 lying above, retainers 12 are provided in the cab 11 with which the one longitudinal edge of the recliner surface material 1 is secured above in the cab 11. The recliner surface material 1 is secured along the lower longitudinal edge with the help of tensioned belts 8, tension devices, or the like, within the cab 11. In this manner, there is configured a hold-back or, respectively, a storage net, for various luggage items and other items which are carried along in the vehicle or, respectively, in the cab 11.

Each stringer 3 which belongs to the one multi-purpose recliner whose recliner surface material 1 functions as a hold-back or storage net, as well as both stringers 3 of the other multi-purpose recliner and, as desired, the spacers as well, can be rolled up together by the rollable recliner surface material 1 of the other multi-purpose recliner into a compact packet 13. This packet 13 can be fixedly but releasably secured in the vehicle via suitable securement means 14 behind the space available for the hold back or storage items, preferably on the back wall of the cab 11 of the vehicle.

The specification incorporates by reference the disclosure of German priority document DE 103 29 460.0 filed 1 Jul. 2003.

The present invention is, of course, in no way restricted to the specific disclosure of the specification and drawings, but also encompasses any modifications within the scope of the appended claims.

The invention claimed is:

1. A multi-purpose recliner having a recliner surface for a person, comprising:
    a recliner surface material that can be rolled up and unrolled and that is adapted to form said recliner surface, wherein longitudinal edges of said recliner surface material are respectively provided with receiving means;
    a frame that is adapted to be disassembled, wherein said frame comprises two stringers, each of which is removably accommodated in respective ones of said receiving means, wherein said frame further comprises two spacers that are releasably securable with said stringers, and wherein said multi-purpose recliner is usable inside and outside a motor vehicle; and
    a suspension mechanism, wherein said multi-purpose recliner is adapted to be disposed in various states and positions of assembly within the vehicle, including:
  in the vehicle via said suspension mechanism and with said recliner surface material spread out or unrolled in a generally horizontal orientation; secured in the vehicle in a generally vertical or slantwise orientation with said recliner surface material forming a hold-back or storage net; or a packet that can be stored and fixedly but releasably secured in the vehicle and is formed by said recliner surface material, which is adapted to cover said stringers and said spacers.

2. A multi-purpose recliner according to claim 1, wherein the suspension mechanism is secured to the recliner surface material at at least four securement locations thereon.

3. A multi-purpose recliner according to claim 2, wherein the suspension mechanism comprises belts or loops.

4. A multi-purpose recliner according to claim 1, wherein the recliner surface material is net material or cloth material.

5. A multi-purpose recliner according to claim 1, wherein said multi-purpose recliner is usable inside and outside a cab of a military vehicle.

6. A multi-purpose recliner according to claim 1, wherein said frame is provided with at least one of pivotable or detachable foot pedestals and hand grips.

* * * * *